United States Patent [19]

Thome

[11] 3,996,102
[45] Dec. 7, 1976

[54] SUPPORT GRID
[75] Inventor: Paul Thomé, Saint-Cloud, France
[73] Assignee: Babcock-Atlantique Societe Anonyme, Paris, France
[22] Filed: May 30, 1972
[21] Appl. No.: 257,902
[52] U.S. Cl. .............................. 176/87; 165/162; 176/78; 248/68 R; 403/173; 403/346; 134/182; 137/590
[51] Int. Cl. ........................................... G21c 3/34
[58] Field of Search ................. 176/87, 76, 78, 88; 287/189.36 A, 189.36 B, 51; 52/655, 666, 668, 660, 663, 758 A, 758 B; 165/162, 178, 174, 159; 138/111, 112; 248/68 R, 68 CB, 49; 220/21, 22.3; 403/346, 173, 270; 137/590; 134/182

[56] References Cited
UNITED STATES PATENTS

| 586,260 | 7/1897 | Winslow | 287/189.36 A |
|---|---|---|---|
| 1,918,116 | 7/1933 | Mansfield | 52/660 X |
| 2,936,530 | 5/1960 | Bowen | 403/173 X |
| 3,014,853 | 12/1961 | Sheehan | 176/78 X |
| 3,067,903 | 12/1962 | Jones | 220/22.3 X |
| 3,076,534 | 2/1963 | Shapira | 403/173 |
| 3,186,522 | 6/1965 | McCauley | 52/663 |
| 3,235,463 | 2/1966 | Sankovich | 176/78 X |
| 3,278,388 | 10/1966 | Thome | 176/76 X |
| 3,663,367 | 5/1972 | Calvin | 176/78 |

FOREIGN PATENTS OR APPLICATIONS

| 679,426 | 2/1964 | Canada | 52/663 |
|---|---|---|---|
| 1,807,418 | 5/1970 | Germany | 176/87 |
| 6,509,097 | 1/1966 | Netherlands | 176/78 |
| 907,535 | 10/1962 | United Kingdom | 176/78 |

Primary Examiner—Roy D. Frazier
Assistant Examiner—Rodney H. Bonck
Attorney, Agent, or Firm—J. M. Maguire; J. P. Sinnott

[57] ABSTRACT

A grid or lattice structure for a nuclear reactor fuel element support in accordance with the invention includes two components that are successively joined by electron beam welding. Extruded cruciform bars which provide the lattice nodes and flat plates which interconnect these nodes, are for example, typical components. Electron beam welding these components together avoids the need for a filler metal, and the welding sequence avoids distortion, thereby obviating the need for post machining operations. Consequently, the plates and bars can be provided with machined positioning or fastening fittings before the lattice is assembled. Illustratively, studs on the cruciform bars are used to join these bars to the elementary plates that form the individual components of a reactor coolant flow distribution plate.

1 Claim, 13 Drawing Figures

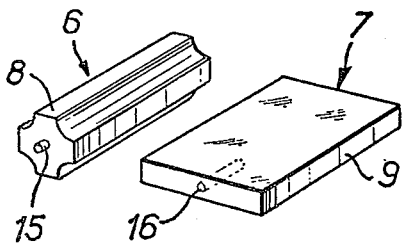
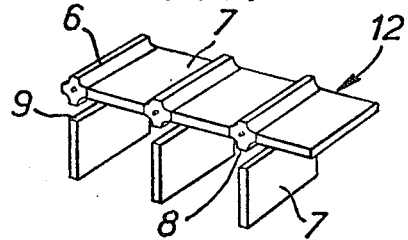
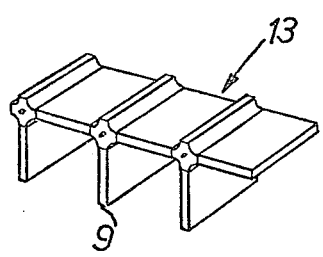
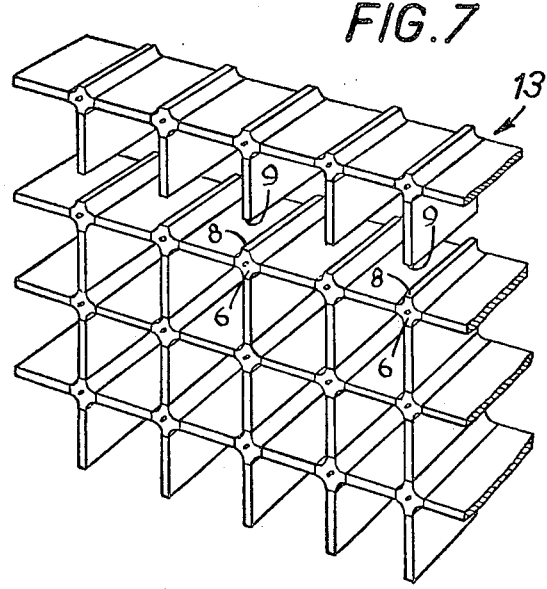
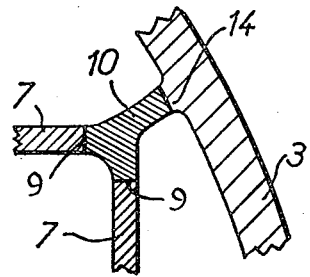
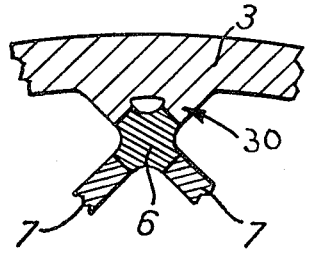
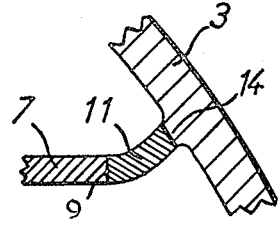
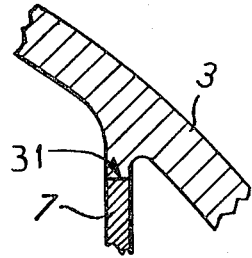

SUPPORT GRID

BACKGROUND OF THE INVENTION

1. Field of the Invention

The present invention relates to nuclear reactor systems, and more particularly to frameworks in the form of grids which serve as supports, rests or suspensions for the fuel elements in water cooled nuclear reactors that are characterized by pressurized water or boiling water.

2. Description of the Prior Art

Fuel element supports usually are formed by a network of intersecting beams which rest with their two ends on a peripheral hoop. Each of these beams is a metal block, placed on edge, equal in length to its span, and the complete series of metal blocks constituting the grid is cut to length, suitably notched to allow them to interlock, then placed along the guidelines of the lattice and welded together at their interlocking points.

Such methods of construction are time-consuming, costly and laborious. They require the preparation and machining of each beam at the future points of mutual intersection with the beams in the grid, the assembly of all these beams to form the complete grid, and welding the beams together at the intersections. This welding is a particularly delicate operation that should be carried out according to a carefully established program to compensate, insofar as possible, for warping of the unit as a whole because of the welds at each of the individual points of intersection. This welding program, however, does not insure the desired precision for the location of the intersections in the lattice that finally is produced. As a consequence, framework attachment means, such as centering pins, threaded holes, and the like that are designed to receive reactor core components must be installed or formed after the framework has been assembled. Because the framework is heavy and bulky, machining and installation of these attachment means is a troublesome operation. The welds, moreover, that are deposited on the lines of intersection sometimes tend to be weak because of the "notch effect." These welds also are not very adaptable to automated non-destructive inspection and quality control methods.

It is an object of the present method to eliminate these drawbacks and to facilitate, in a general way, the construction of support grids of the above-mentioned type.

SUMMARY OF THE INVENTION

In accordance with the invention, a support grid is composed of profile bars situated at the mutual intersections or lattice nodes and plates that are disposed all along the controlling lines of the lattice in the intervals between bars. The plates are welded along two of their opposing borders to the profile bars between which they are placed.

According to one embodiment of the invention, the profile bars and the plates may have faces or edges that are rolled to a required shape in order to aid the subsequent welding operation.

In a particular application of the invention, the plane edges of the plates contact the respective flat faces of the profile bars. The plates then are joined to the bars by means of electron beam welding along established planes of contact.

Electron beam welding makes it possible to assemble the grid without distortion and within the narrow tolerance that will enable the reactor attachment means to be fitted to the individual component pieces before assembly. The flat welding faces of the profile bars, when viewed in full section, preferably will constitute the terminal faces of the arms of a cruciform or star-shaped structure in order to promote electron beam welding.

The hoop surrounding the support grid also has connection means, or attachment means, to aid in joining the hoop to the ends of the beams or to the nodes in the lattice. In one embodiment, for instance, this assembly comprises an intermediate piece which has, in cross section, a star shape. Several of the star's arms are disposed toward the lattice beams to enable the beam ends to be welded to the associated arms. Other star arms, perpendicular to the hoop, are welded to the hoop's inner face.

According to another embodiment of the invention, this intermediate piece has, in cross section, a curved form. Tangents to two ends of this curve being disposed, respectively, toward the extension of one of the beams in the lattice and in a direction that is normal to the inner face of the hoop.

Advantageously, the attachment means formed on the inner face of the hoop consists of a simple deposit of molten metal.

Preferably, the basic lattice structure for the support grid is arranged in two directions to form, for example, square or rectangular meshes. If necessary, however, the lattice structure can be arranged to establish, for example, a grid with triangular meshes.

Considered from another viewpoint, a typical method of construction according to the invention makes use of an array of alternating profile bars and plates. These components, that constitute the basic structural elements are organized in a common plane. They are assembled, moreover, with respective flat faces and plane edges in contact. The components are welded together in the planes of contact through an electron beam.

At the location of each of the profile bars in the block thus formed, a plate is placed at right angles to the plane of the block. A plane edge on the plate is disposed in contact with a plane face on the adjacent profile bar. The components are welded along the planes of mutual contact through electron beams in order to establish a structural module that has the form of a rake with widely spaced teeth. In the illustrative embodiment of a square-mesh lattice the length of the teeth is equal to the spaces between the teeth.

The individual modules are assembled together, two of the modules being assembled by bringing the plane terminal edges of the teeth of one of these modules into contact with the nodes of the other module. The teeth of the two modules are aligned with one another and the assembly is welded in the planes of contact thus established by means of an electron beam.

The grid thus formed is joined to a peripheral hoop, also through electron beam welding, with the aid of the intermediate pieces mentioned above.

According to one development of the invention, moreover, each profile bar in a lower grid is connected to a shaped elementary plate. These elementary plates combine to form through mutual contact along their respective edges, a perforated lower plate for reactor coolant distribution.

BRIEF DESCRIPTION OF THE DRAWING

FIGS. 4, 5, 6, and 7 show, in perspective various phases of a method for building the grid that is shown in FIG. 3;

FIGS. 8 and 9 represent grid assembly attachment means formed on the inner face of the supporting hoop;

FIGS. 10 and 11 are variants of the two preceding figures; and

DESCRIPTION OF THE PREFERRED EMBODIMENTS

Figure 1:
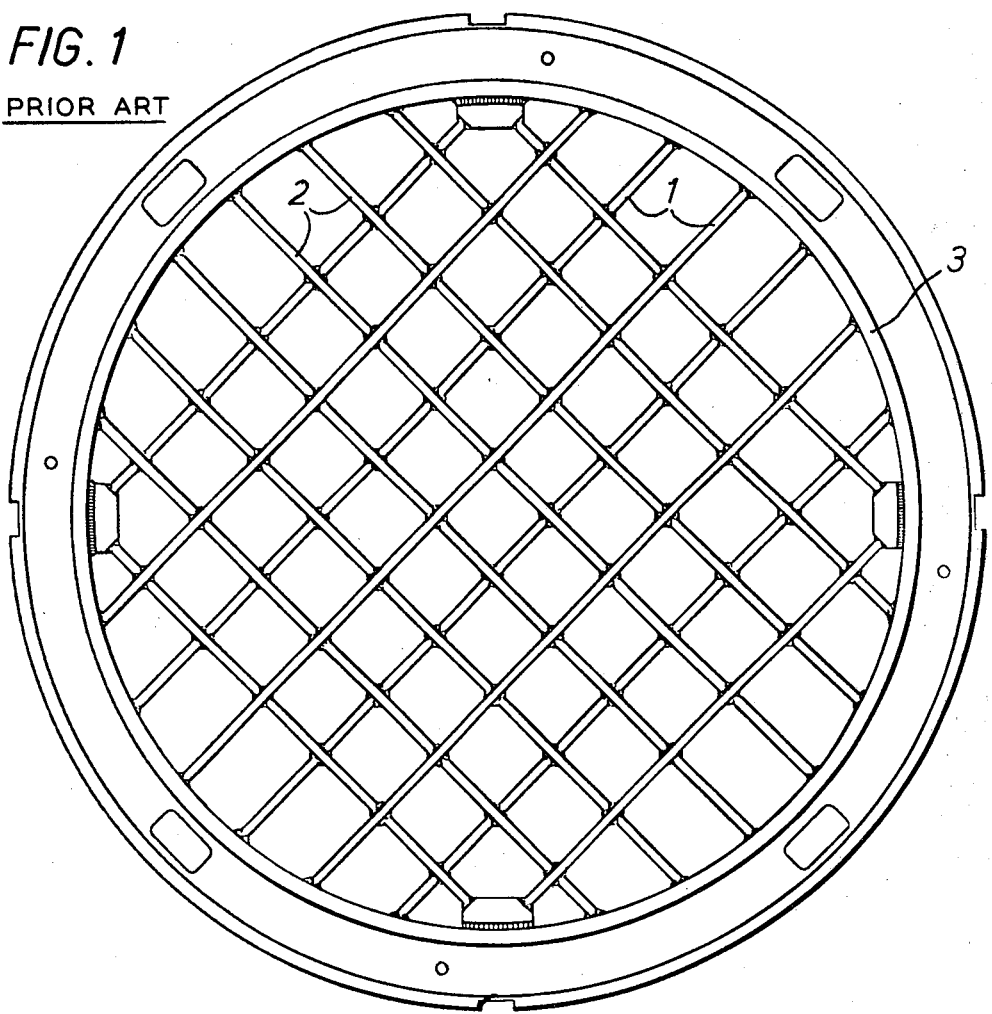
FIG. 1 represents, in plan view a support grid embodied according to a known process.
Figure 2:
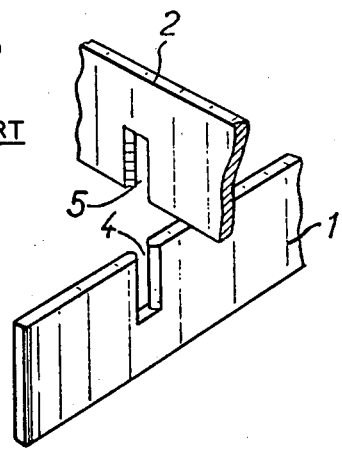
FIG. 2 represents in perspective and on a larger scale, a structural detail of this grid.

In FIGS. 1 and 2, a support grid for a nuclear reactor is composed of a parallel set of beams 1 that are disposed perpendicular to and interlock with a parallel set of beams 2.

These beams are welded with their ends to the inner face of a peripheral hoop 3. At each point of intersection, one of the beams involved (beam 1 in the example in FIG. 2) has a notch which extends from the neutral surface to the upper border; the two vertical borders of this notch 4, moreover, are cut on the bias as shown in the drawing.

As for the beam 2, it also has a notch 5 which extends from the neutral surface to the lower border. The vertical borders of this notch also are cut on the bias or beveled.

The two beams are assembled by placing the two notches 4 and 5 in mutual alignment and then mating them so that each beam will cover the other beam laterally, then welding the interlocking beam along the beveled border.

This method of construction, as noted above, has a number of the drawbacks. For example, this prior art technique requires the preparation and the machining of all of the beams which must be simultaneously assembled. The welding also must be conducted in a way that will minimize deformations and distortions, because the distortions cannot be avoided entirely. Changes in the mesh dimensions also are impossible to predict, owing to the nature of the welding beads. The attachment means (not shown), of which tenons, threaded holes, and the like are typical, must be formed as soon as the whole grid is constructed. The welds also can be fragile owing to the notch effect.

In FIGS. 3 to 9, a grid embodying the present invention is composed essentially of two components, namely profile bars 6 and plates 7. The profile bars have, in cross section, a cruciform shape in which the four arms of each bar terminates in a plane face 8 (FIGS. 4 and 5). The plates 7 have plane edges 9 along two of their opposing borders.

Figure 3:
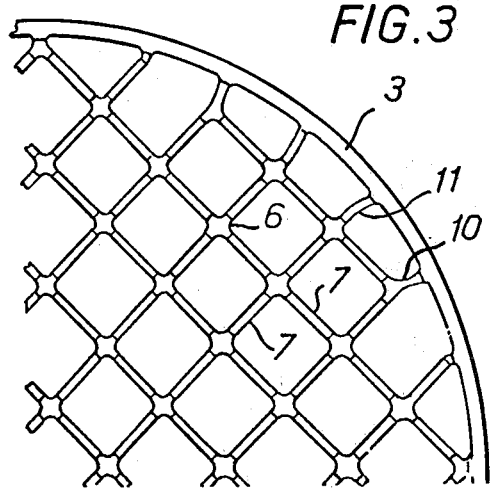
FIG. 3 represents, in a partial view in plan, a grid embodied according to the invention.

In FIG. 3, profile bars are disposed at the intersectional nodes of the grid structure in a direction that is perpendicular to the plane of the drawing. The plates 7 are placed on edge, that is to say, perpendicularly to the plane of FIG. 3, between pairs of the profile bars 6. These plates, moreover, are arranged each along a respective one of two of the lattice's directrices, that is in the two directions of the intersecting beams that form the lattice under construction. The plane edges 9 (FIG. 5) of the plates contact the two corresponding plane faces 8 of the pair of profile bars. The components of the lattice structure are assembled by electron beam welding in the planes of contact thus defined. The intersecting beams thus formed through the component assembly are joined to an inner face of the hoop 3 with the aid of intermediate pieces of various shape, two of which are designated in FIG. 3 by indices 10 and 11, respectively.

According to one method of grid construction as shown in FIGS. 5, 6, and 7, the profile bars 6 and the plates 7 are placed one after the other in a common plane. The edges 9 of the plates 7 are kept in contact with the plane faces 8 of the profiles bars 6, and electron beam welding is carried out in the planes of contact thus defined to form blocks 12 (FIG. 5).

At the location of each profile bar 6 a plate 7 is placed at right angles to the block 12 thus formed. A plane edge 9 on the plate 7 is kept in contact with a plane face 8 of this profile bar, and an electron beam weld is made in the established plane of contact. This assembly is repeated several times in order to produce a module 13 (FIG. 6) that has the form of a rake in which the teeth are provided by the right angle plates 7.

Then the individual modules 13 are assembled as shown in FIG. 7. The assembly of two modules consisting in placing the terminal edges 9 of a module in contact with the plane faces 8 of the profile bars 6 of the adjacent module. The plates 7 of the two modules are aligned with one another prior to being electron beam welded along the planes of contact established by the mutual contact between the respective faces 8 and edges 9.

The grid structure dimensions enable it to be mounted in the peripheral hoop 3 (FIG. 3). This grid, which has an irregular border profile, is provided with intermediate pieces that are welded to the inner face of hoop 3.

As it appears in FIG. 3, some of these intermediate pieces 10, (represented on a larger scale in FIG. 8) have the profile of a three-armed star. Two of these arms terminate in plane faces that contact the plane edges 9 on the two plates 7 that are situated at right angles with one another. The third arm of the star profile terminates in a plane face that is in contact with the plane face of an application or bead of metal 14 that is formed by being built-up on the inner-surface of the hoop 3. The assembly of the piece 10 on the grid and on the hoop is done by electron beam welding along the three established contact planes.

Another intermediate piece 11, represented on a larger scale in FIG. 9, has in cross section, a curved form which terminates in two plane faces, one placed in contact with the plane edge 9 of the plate 7, and the other with metal bead 14, identical to that described above. The curvature of the piece 11 is established in a way that permits it to extend toward the plate 7 without an abrupt change in direction and to connect in a right angle with the bead 14 on the inner face of hoop 3. The intermediate pieces 10 and 11 constitute further examples, and other forms can be adopted according to need, in order, for example, to connect the inner face of hoop 3 directly to the profile bar 6.

This is the case shown in FIG. 10, in which the built-up hoop surface 30 preferably is formed by forging or by welding added ribs rather than through the addition of a metal bead.

In FIG. 11, a forged or welded rib 31 serves to connect the hoop 3 to a single plate 7 that forms a beam end.

Figure 12:
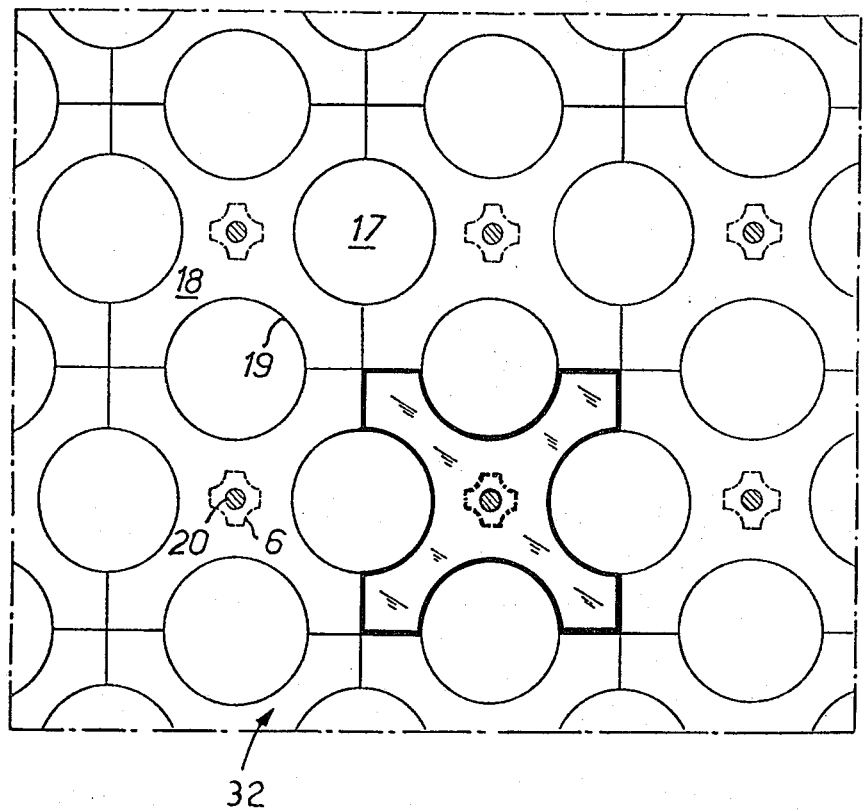
FIGS. 12 and 13 show a lower plate for coolant distribution.
Figure 13:
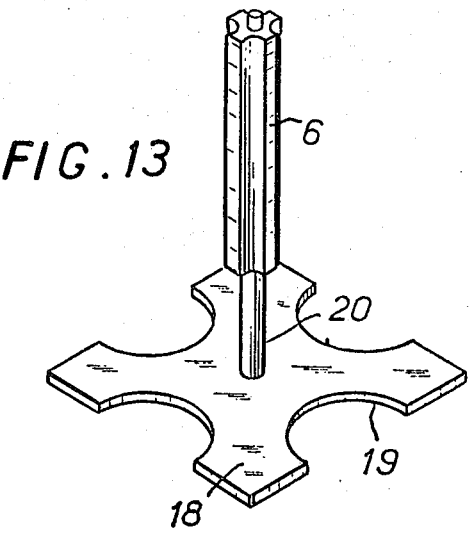

FIG. 12 shows, in a partial plan view, a lower plate 32 for distributing reactor coolant. The plate 32 is situated below, and spaced from a lower support grid that embodies the principles of the invention. This plate, which has perforations 17, is composed of square elementary plates 18. Each of the elementary plates 18 has a semicircular bight 19 formed on each edge (FIG. 13). When the individual elementary plates 18 are arrayed together as shown in FIG. 12, the bights 19 on adjacent elementary plates combine to form the holes 17.

In the FIG. 13 perspective view a rod 20 extends from the center of one end of the profile bar 6. The rod 20 is joined to the central portion of one of the elementary plates 18 that comprise the coolant flow distribution plate 32 shown in FIG. 12. The plates 18 each can be fixed to respective profile bars 6 before assembly of the base components 6, 7. This method of assembly facilitates the construction of the flow distribution plate 32, as well as connecting this plate to the support grid.

The plates 7 have been omitted from FIG. 12 for the sake of clarity.

Thus, in accordance with the invention, the complicated post-assembly machining is avoided and the faces that are welded together through the practice of the invention are easy to form by rolling.

The cruciform profile bars 6 also facilitate electron beam welding because the plane faces 8 protrude from the profile.

Grid structure fabrication, moreover, requires only components of small size, thereby making it possible to separate the various operations and reduce the costs of equipment. The subdivision of the fabrication process into several operations that are carried out in sequence makes it possible to reduce assembly time. For example, the production of the blocks 12 (FIG. 5) can be carried forward, simultaneously with the production of the individual modules 13 and with the assembly of the modules together.

This method of fabrication permits automated welding. Electron beam welding, moreover, insures improved lattice quality in comparison to prior techniques.

Electron beam welding, for instance, eliminates distortions. Variations in length caused by electron beam welding not only are minimal, but also are relatively easy to predict with precision.

Accordingly, the attachment means which are designed to receive the nuclear reactor core structure can be formed on the elementary components before they are assembled into a lattice structure, in contrast to the prior art technique of arranging the attachment means on an assembled grid. The machining of these attachment means, as for example, a tenon 15 and a threaded hole 16 shown in FIG. 4, for a lattice structure that is built in accordance with the present invention is a relatively simple operation, which, if done before hand, further reduces the reactor system fabrication time.

What is claimed is:

1. A support grid for a nuclear reactor fuel element assembly, characterized by a lattice of intersecting, beams, wherein each intersection of the lattice is a lattice node and each direction along a beam is a lattice directrix, comprising; a plurality of profile bars, said bars being disposed at each of said lattice nodes; a plurality of flat plates each having at least two opposing borders; each of said flat plates being disposed along a lattice directrix in the intervals between adjacent pairs of said profile bars; said flat plates being welded along two of said opposing borders to said adjacent profile bars; a peripheral support hoop having a plurality of metal beads formed on the inner surface of said hoop, a plurality of intermediate pieces each individual to a respective one of said flat plates to join each of said beads to the adjacent flat plates through said intermediate pieces; wherein at least one of said intermediate pieces has at least two ends, one of said ends being connected to the end of one of said plates and is connected out of the plane of said flat plate at another of said two ends to one of said beads and a plurality of rods a rod protruding from one end of each of said profile bars, and a plurality of elementary plates each in engagement with a respective one of said rods, said plates having peripheral notches formed therein for fluid.

* * * * *

UNITED STATES PATENT AND TRADEMARK OFFICE
CERTIFICATE OF CORRECTION

PATENT NO. : 3,996,102
DATED : December 7, 1976
INVENTOR(S) : P. Thome

It is certified that error appears in the above-identified patent and that said Letters Patent are hereby corrected as shown below:

Column 6,

Line 46, after the word "fluid" insert --distribution--.

Signed and Sealed this

Fifteenth Day of March 1977

[SEAL]

Attest:

RUTH C. MASON
*Attesting Officer*

C. MARSHALL DANN
*Commissioner of Patents and Trademarks*